United States Patent [19]

Neale et al.

[11] 3,865,784
[45] Feb. 11, 1975

[54] STABILIZED ORGANOSILICON POLYMERS

[75] Inventors: Robert Schwenn Neale, Ossining; Arthur Noah Pines, Katonah, both of N.Y.

[73] Assignee: Union Carbide Corporation, New York, N.Y.

[22] Filed: Dec. 5, 1973

[21] Appl. No.: 422,090

[52] U.S. Cl.. 260/45.75 R, 260/37 SB, 260/46.5 R, 260/46.5 G, 260/448.2 R
[51] Int. Cl............................................ C08g 51/56
[58] Field of Search... 260/45.75 R, 46.5 G, 46.5 R, 260/37 SB, 448.2 R

[56] References Cited
UNITED STATES PATENTS

| | | | |
|---|---|---|---|
| 3,261,802 | 7/1966 | Bobear | 260/45.75 R |
| 3,352,781 | 11/1967 | Buehler | 252/37.2 |

Primary Examiner—Melvyn I. Marquis
Attorney, Agent, or Firm—Reynold J. Finnegan

[57] ABSTRACT

Process for preparing stabilized iron-containing diorganopolysiloxane polymers and the stabilized polymers produced thereby which are useful in the field of high temperature service.

28 Claims, No Drawings

3,865,784

STABILIZED ORGANOSILICON POLYMERS

BACKGROUND OF THE INVENTION

This invention relates to a novel process for preparing iron-stabilized diorganopolysiloxane compounds and to the novel stabilized iron-containing siloxane products produced thereby.

It is well known in the art that diorganopolysiloxanes have many industrial applications in the field of high temperature service, e.g. as heat-transfer fluids, hydraulic fluids, high temperature lubricants, and the like. However it is also well known that such diorganopolysiloxanes are susceptible to breakdown through depolymerization and oxidation for prolonged periods of time at temperatures exceeding 200°C. Various stabilization methods have been proposed by the prior art to solve this problem. In most instances, soluble or partially soluble forms of transition metal compounds have been directly added to the siloxane polymer to be stabilized without further treatment of the resulting mixture as seen for example by the proposed use of carboxylate salts of iron, cobalt, nickel and copper as antioxidants in U.S. Pat. No. 2,445,567. The use of other types of antioxidants has also been proposed, e.g. ferrocenyl-substituted siloxanes, as seen in Chemical Abstracts, 72, page 32,635 P (1970) and U.S. Pat. No. 3,649,660, and iron oxide as proposed by U.S. Pat. No. 3,352,781. More recently U.S. Pat. No. 3,002,927 has taught the use of iron salts of carboxylic acid along with mechanical aeration at greatly elevated temperatures of the siloxane mixture prior to use.

It has now been surprisingly discovered that iron carbonyl may be thermally decomposed in diorganopolysiloxanes in the presence of oxygen to yield iron-containing diorganopolysiloxanes which are stabilized against decomposition even at greatly elevated temperatures, e.g. above 600°F., in the presence of air. In contrast with all prior art stabilization procedures which introduce iron in some already oxidized form to the siloxane polymer to be stabilized, the iron carbonyl stabilizer of the present invention is initially introduced in its zero oxidation state. Moreover the present invention offers a number of advantages over previous metal-based systems, e.g. an easy, non-complicated method for producing stabilized iron-containing diorganopolysiloxanes at relatively mild temperatures, and a method for producing homogeneous appearing stabilized ironcontaining diorganopolysiloxanes which are characterized by their absence of sludging during storage and in use, and their ability to withstand thermal decomposition for prolonged periods at extremely high service temperatures, such as up to 325°C., especially in the presence of air. The present invention also offers a method for producing concentrated stabilized iron-containing diorganopolysiloxanes.

Accordingly it is an object of this invention to provide a process for the production of stabilized iron-containing diorganopolysiloxane compounds. It is also an object of this invention to provide for stabilized iron-containing diorganopolysiloxanes produced by said process. Other objects and advantages of this invention will become readily apparent from the following description and appended claims.

SUMMARY OF THE INVENTION

More particularly the instant invention is directed to a process for preparing stabilized iron-containing diorganopolysiloxane compounds which comprises heating a mixture consisting essentially of (1) a diorganopolysiloxane compound and (2) an iron carbonyl compound at a temperature of at least about 120°C. in the presence of oxygen, as well as to the stabilized iron-containing diorganopolysiloxane compounds produced by said process.

DESCRIPTION OF THE PREFERRED EMBODIMENTS

The diorganopolysiloxane starting materials that may be employed in the present invention include diorganopolysiloxane fluids or oils including diorganopolysiloxane gums curable to cross-linked silicone elastomers. Such siloxane starting materials as well as methods for their production are well known in the art as witnessed for example by U.S. Pat. Nos. 2,445,567; 3,002,927; 3,317,428; 3,352,781; 3,696,068 and the like. In general such siloxane starting materials are siloxane polymers consisting essentially of siloxy units selected from the group consisting of $R_3SiO_{0.5}$, $R_2SiO$, $R(OH)SiO$ and $R_2(OH)SiO_{0.5}$ units wherein R is a member selected from the group consisting of monovalent hydrocarbon radicals and substituted monovalent hydrocarbon radicals. Of course it is understood that each R can be the same or different throughout the siloxane and that the siloxane can contain any combination of the above siloxy units so long as the resulting material is a fluid or oil including siloxane gums cureable to cross-linked silicone elastomers. Preferably the siloxane starting materials have a viscosity of at least 20 centistokes at 25°C.

Illustrative monovalent hydrocarbon radicals represented by R above include alkyl radicals (such as, methyl, ethyl, propyl, butyl, pentyl, hexyl, octyl, decyl, dodecyl, octadecyl, eicosyl, and the like); aryl radicals (such as phenyl, naphthyl, and the like) and a vinyl radical. Illustrative substituted monovalent hydrocarbon radicals represented by R above include haloalkyl radicals (such as trifluoropropyl, and the like), cyanoalkyl radicals (such as cyanopropyl, and the like); and carboxyalkyl radicals (such as carboxyethyl, and the like). Preferably R contains from 1 to 20 carbon atoms and more preferably represents an unsubstituted monovalent hydrocarbon radical selected from the group consisting of alkyl, phenyl and vinyl radicals, especially methyl.

As is well known in the art while such diorganopolysiloxane starting materials are generally only represented as containing triorganosiloxy terminal units, e.g. $R_3SiO_{0.5}$, and diorganosiloxy units, e.g. $R_2SiO$, they may in addition contain small amounts of $R\,SiO_{3/2}$ and $SiO_2$ siloxy units depending upon the manner in which the polymer is made. Of course it is to be understood that a single type of diorganopolysiloxane polymer can be employed or if desired various combinations of different siloxane polymers can be used as the starting material of the present invention. Indeed the diorganopolysiloxane starting material of the present invention generally consists of mixtures of the same type of siloxane polymers since this is how they are conventionally prepared.

Illustrative of the more preferred diorganopolysiloxane starting materials are those consisting essentially of siloxy units selected from the class consisting of dimethylsiloxy, diphenylsiloxy, methylphenylsiloxy, methylhydroxysiloxy, methylvinylsiloxy, trimethylsiloxy and dimethylhydroxysiloxy units. The most preferred siloxane polymer starting materials have a viscosity ranging from about 20 up to 10,000 centistokes at 25°C. and more preferably from about 50 to 4,000 centistokes at 25°C. Specific classes of the more preferred siloxane polymers are trimethylsiloxy end-blocked dimethylpolysiloxanes, dimethylhydroxysiloxy end-blocked dimethylpolysiloxanes, and mixtures thereof, especially the trimethylsiloxy end-blocked dimethylpolysiloxanes.

It has also been found that especially excellent stabilized iron-containing siloxane products have been obtained when the siloxane polymer starting material contains at least 0.8 parts by weight, more preferably about 1 part by weight, of hydroxy groups attached to a silicon atom of the siloxane starting material per one part by weight of iron in the stabilized ironcontaining siloxane product. It is well known in the art that trimethylsiloxy end-blocked dimethylpolysiloxanes due to the manner in which they are produced contain a small weight percentage of hydroxyl groups attached to silicon atoms in the polymer. Thus such trimethylsiloxy endblocked dimethylpolysiloxanes may contain a sufficient amount of such hydroxyl groups to satisfy the production of the more optimum stabilized iron-containing siloxane products of this invention. If not, such optimum results may alternatively be obtained by increasing the hydroxy content of the trimethylsiloxy endblocked dimethylpolysiloxane starting material to its desired amount by adding siloxanes containing hydroxysiloxy groups to said starting material. The hydroxy content of the siloxane polymer starting material is measured by quantitatively determining via gas chromotography the methane released from an excess of methyl Grignard reagent upon its reaction with the active hydrogen of the hydroxy groups of said siloxane polymer starting material.

The iron carbonyl compounds that may be employed in the process of the present invention include any iron carbonyl, such as $Fe(CO)_5$, $Fe_2(CO)_9$, $Fe_3(CO)_{12}$, and the like, as well as mixtures of such iron carbonyls if desired. Such iron carbonyls as well as methods for their production are well known in the art as seen, e.g. by U.S. Pat. No. 3,278,441. The preferred carbonyl is iron pentacarbonyl, $Fe(CO)_5$. The amount of iron carbonyl employed in the process of this invention is not narrowly critical. In theory any amount of iron in the siloxane product will result in some improvement in its stability. In general the amount of iron carbonyl employed should be sufficient to provide from 20 parts by weight of iron up to 10,000 parts by weight of iron in the siloxane product based on a million parts by weight of the siloxane starting material. Preferably the amount of iron carbonyl employed is that amount sufficient to provide from 50 parts by weight of iron up to 400 parts by weight of iron, and more preferably from 100 parts by weight of iron up to 250 parts by weight of iron in the siloxane product based on a million parts by weight of the siloxane starting material. The amount of iron in the siloxane product is easily measured by atomic absorption spectroscopy.

It should be understood that the term "oxygen" as employed herein includes pure oxygen, air, and other mixtures of oxygen with inert gases such as helium, argon, and the like. For obvious economical and practical reasons air is the preferred source of the oxygen. The instant process need only be conducted in the presence of oxygen, e.g. it may be conducted even where only the surface of the reaction mixture is exposed to oxygen. The amount of oxygen employed is not absolutely critical and need only be that amount sufficient in order to obtain the desired stabilized ironcontaining siloxane product. The preferred amount of oxygen is that amount required to decompose the iron carbonyl and provide an apparently homogeneous thermally stabilized iron-containing siloxane product.

In the process of this invention the mixture of diorganopolysiloxane starting material and iron carbonyl compound is heated at a temperature of at least about 120°C. in the presence of oxygen to decompose the iron carbonyl compound and form a stabilized iron-containing diorganopolysiloxane product solution that ranges from yellow to deep red in color. The reaction temperature is not narrowly critical and may range as high as 350°C., if desired. In general it is preferred to employ reaction temperatures ranging from about 150°C. to about 200°C., with about 150°C. being the optimum temperature. The time period of heating is not absolutely critical and will of course vary depending upon such obvious factors as the siloxane polymer employed, the amount of iron desired in the final product, the reaction temperature, the degree of stability desired for the final product, and the like, and such may easily be determined by routine experimentation. For instance, in general the lower the reaction temperature the longer the reaction time and the higher the temperature the shorter the time required.

In carrying out the process of this invention the siloxane polymer starting material and the iron carbonyl may be mixed in any convenient manner and the reaction carried out in the presence of oxygen by any suitable means. For instance, oxygen may be bubbled through the reaction mixture or the reaction may be conducted in an open or partially open vessel exposed to the free circulation of oxygen. Likewise a thin film of the reaction mixture can be exposed to oxygen. Alternatively the reaction mixture can be caused to flow down a heated column, e.g. a tube made out of glass, copper, steel, and the like, while oxygen is passed over the flow of the reaction mixture, preferably in the opposite direction. Such a method may be suitable for continuous production of the desired stabilized siloxane product at high temperatures, e.g. about 250°C. to about 350°C., preferably about 275°C. to about 325°C. The process of the instant invention is preferably carried out under substantially anhydrous conditions, that is to say the deliberate or inadvertent introduction of water to the reaction mixture should be avoided. The preferred method of operation merely involves circulating or passing oxygen, e.g. air, over the surface of the reaction mixture. The rate of air (oxygen) flow over the surface of the reaction mixture is not absolutely critical and any rate may be used. However it has been found that the amount of iron retained in the siloxane product is inversely related to the rate of air flow. For example a resulting product prepared from a process carried out in an essentially open flask with free circulation of air and a large vapor space above the reaction mixture was found to contain far less iron than a resulting product prepared from a process that had far less exposure of the reaction mixture to air per unit of time and volume. Thus too great an air flow rate may cause a reduction in the amount of iron contained in the siloxane product due to the high volatility of iron carbonyl. Further too slow an air flow rate may lead to undesirable precipitation of iron compounds and a relatively poorly stabilized product. It has also been found that a reaction mixture heated at very high temperatures, e.g. 300°C. and with a large exposed surface to volume ratio (e.g. about 1 sq. cm. of surface area per 1 cu. cm. of volume) in the presence of air results in a good stable product with little iron loss, but at lower and more typical surface/volume ratios (e.g. about 1 sq. cm. or less per 10 cu. cm. of volume), or in the absence of sufficient air undesirable precipitation of iron compounds and poorer stabilization results. Of course it is obvious that the precise rate of air flow needed to retain a maximum percentage iron originally employed while facilitating conversion of the iron carbonyl to the ultimate stabilized product will merely depend upon obvious operating conditions, such as the reaction temperature and amount of iron carbonyl employed, the surface to volume ratio of the reaction mixture, and the like, and such can easily be determined by routine experimentation. Preferred stabilized iron-containing diorganopolysiloxane products are produced in the form of an apparently homogeneous solution which is free from any precipitates.

Due to the high volatility of liquid iron carbonyl and the resulting toxicity of its vapors, it is most preferred to carry out the process of this invention by first mixing the iron carbonyl with a convenient amount of the siloxane polymer to be treated at about room temperature and then add this premixture under a nitrogen blanket to the rest of the siloxane polymer starting material which has been preheated to the desired reaction temperature. The addition of the premixture is preferably conducted under the slowest possible nitrogen flow. Upon completion of said addition, oxygen preferably in the form of air is passed over the surface of the reaction mixture and the reaction temperature maintained until the desired stabilized iron-containing siloxane product is obtained. During the aeration step of the process carbon monoxide and carbon dioxide gas vapors from decomposition of the iron carbonyl compound are evolved and removed and the color of the reaction mixture deepens from yellow to deep red depending upon the final concentration of iron in the product mixture, the deeper red the color the more iron present. Completion of the reaction may be observed in any number of ways. Generally it is preferred to decompose all of the iron carbonyl employed although such is not absolutely necessary. Decomposition of all of the iron carbonyl is witnessed by the changing color of the reaction mixture from yellow to deep red as explained above, by the absence of carbon monoxide and carbon dioxide gas vapors being evolved, and by reduction to a minimum of the formation of cloudy vapors in the space above the liquid reaction mixture in the preferred procedure. In general reactions at moderate temperatures such as 150°. to 200°C. will be completed within one to six hours, while reactions at high temperatures such as 250°. to 350°C. may be completed within thirty minutes.

The present invention is unique in that it provides for the production at mild temperatures of stabilized iron-containing diorganopolysiloxane fluids and oils in an apparently homogeneous form which are further characterized by their absence of sludging during storage and in use and their ability to withstand thermal decomposition for prolonged periods of time at temperatures up to 325°C., especially in the presence of air. Highly concentrated stabilized iron-containing diorganosiloxanes can also be prepared by the present invention. Indeed the present invention can even be used to produce stabilized silicone rubber by adding the iron carbonyl compound to the heat curable gum-stock composition.

The stabilized iron-containing diorganopolysiloxane products of this invention have a wide range of utility in the field of high temperature service that is well known in the art. For instance they can be used as heat transfer fluids such as, radiator fluids, quenching baths for metal parts, etc.; high temperature greases and lubricants such as, in the manufacture of synthetic fibers, etc,; hydraulic fluids such as, the coupler fluid for an automotive fan clutch, etc.; electrical insulating fluids; and the like.

The following examples are illustrative of the present invention and are not to be regarded as limitative. It is to be understood that all parts, percentages and proportions referred to herein and in the appended claims are by weight unless otherwise indicated.

EXAMPLE 1

One hundred fifty grams of a trimethylsiloxy endblocked dimethylpolysiloxane oil having a viscosity of 350 centistokes at 25°C was added to a 250 ml. 3-necked flask fitted with a heating mantle, mechanical stirrer and thermometer, followed by 0.15 grams of iron pentacarbonyl, $Fe(CO)_5$ (about 75% purity). A 2-mm stopcock was placed in the third neck to permit venting with minimum mixing of the carbonyl vapors with the outside air. The mixture was heated to 150°C., whereupon the color of the reaction mixture turned from yellow to deep red as carbon monoxide and carbon dioxide gas was evolved. After three hours a red precipitate was formed. The reaction mixture was heated for one additional hour and then cooled. The resulting iron-containing siloxane product was found to contain 220 parts by weight of iron (including precipitate) per million parts by weight of the siloxane product and was tested for stability according to Example 8 with the results shown in TABLE 1.

EXAMPLE 2

Example 1 was repeated except that a reaction temperature of 200°C. and a total heating time of 1.3 hours were employed. A red precipitate appeared after one hour of heating. The resulting iron-containing siloxane product was found to contain less than 245 parts by weight of iron (including precipitate) per million parts by weight of the siloxane product, and was tested for stability according to Example 8 with the results shown in TABLE 1.

EXAMPLE 3

Example 1 was repeated except that the reaction was carried out at 124°C. for 20 hours. The resulting iron-containing siloxane product was found to contain 180 parts by weight of iron per million parts by weight of the siloxane product and was tested for stability according to Example 8 with the results given in TABLE 1.

EXAMPLE 4

Example 1 was repeated except that after 1.5 hours of heating, air at the rate of 50 cc./min. was bubbled through the reaction mixture for 5.5 hours. A red, homogeneous iron-containing siloxane product solution was obtained which was found to contain 160 parts by weight of iron per million parts by weight of the siloxane product. Said product solution was tested for stability according to Example 8 with the results given in TABLE 1.

EXAMPLE 5

Example 2 was repeated except that air at the rate of 50 cc./min. was bubbled through the reaction mixture for two and one-half hours after one-half hour of initial heating under the stagnant initial atmosphere. The reaction mixture was then heated for an additional three hours with no air flow. A homogeneous iron-containing siloxane product solution was obtained which was found to contain 200 parts by weight of iron per million parts by weight of the siloxane product solution. Said product solution was tested for stability according to Example 8 with the results given in TABLE 1.

EXAMPLE 6

Example 1 was repeated except that air at a rate of 200 ml./min. was bubbled through the reaction mixture during heat-up to 150°C. (about 0.7 hours) and for 2 hours thereafter. A lemon yellow iron-containing siloxane product solution was obtained which was found to contain only 65 parts by weight of iron per million parts by weight of the siloxane product solution. Said product solution was tested for stability according to Example 8 with the results given in TABLE 1.

EXAMPLE 7

A mixture of 150 grams of a trimethylsiloxy end-blocked dimethylpolysiloxane oil having a viscosity of 350 centistokes at 25°C. and 0.15 grams of iron pentacarbonyl, $Fe(CO)_5$ (about 75% purity) was prepared, without having any preheating treatment to decompose the carbonyl compound; said untreated mixture was tested for stability according to Example 8 with the results shown in TABLE 1.

EXAMPLE 8

Thermal stability tests were carried out on the iron-containing siloxane products of Example 1 to 7 according to the following procedures and the results given in TABLE 1.

BEAKER STABILITY

This test represents the thermal stability of the iron-containing siloxane products in unlimited air at 325°C. The test was conducted on a 10 gram sample of the iron-containing siloxane product in an uncovered 50 ml. beaker in a circulating air oven; the sample surface area of siloxane product to volume ratio of siloxane product was 1.1 cm.$^2$/ml. The time of gel was taken as that at which no flow of the siloxane product occurred in the hot sample.

PLUGGED TUBE STABILITY

This test represents the thermal stability of the iron-containing siloxane products in highly limited air at 325°C. The test was conducted on a 5 gram sample of the iron-containing siloxane product in a 4-inch culture tube containing a tight glass wool plug at the mouth. The tube was 60 per cent filled at 25°C. giving a sample surface area of siloxane product to volume ratio of siloxane product of about 0.2 cm.$^2$/ml. Times were recorded of the formation of a precipitate, if any, and of moderate gellation, usually near the surface of the siloxane product. The weight loss percent of the siloxane product was also recorded and was found to be roughly proportional to the times of exposure after the initial, rapid loss of any volatiles.

TABLE 1

| EXAMPLE NO. | BEAKER STABILITY | | PLUGGED TUBE STABILITY | |
|---|---|---|---|---|
| | HOURS TO GEL | SAMPLE WT. LOSS, % | HOURS TO GEL. | HOURS TO PRECIPITATE |
| 1 | 24 | 20 | 24 | 6 |
| 2 | 18 | 16 | 24 | 18 |
| 3 | 600 | 50 | 24 | 18 |
| 4 | 790 | 53 | 96 | None |
| 5 | 815 | 54 | >96 | None |
| 6 | <116 | 37 | — | — |
| 7 | 600–700 | — | <24 | 1 – 2 |

EXAMPLES 9–17

A series of stabilized iron-containing siloxane products were prepared by the following general procedure employing the specific conditions given in Table 2. To 125–200 grams of the trimethyl siloxy end-blocked polydimethylsiloxane fluid to be treated was added an amount of $Fe(CO)_5$ equal to 0.1 weight percent of the total siloxane fluid. The iron carbonyl-siloxane concentrate was placed in a 250 ml. pressure-equalizing addition funnel mounted via a T-adapter on a 3-neck round bottom flask, which contained the remaining siloxane fluid. A slow nitrogen stream was passed over the siloxane oil via the T-adapter and exited via a 1 mm. stopcock in the third joint. The siloxane oil was mechanically stirred at the point of incipient vortex and brought to about 150°C. Addition of the iron carbonylsiloxane concentrate was then begun under the slowest possible nitrogen flow. Heating was continued as indicated with very little color change and no gas evolution. Upon exposure to surface aeration as indicated, carbon monoxide and carbon dioxide was evolved and the color of the reaction mixture deepened from yellow to orange-red.

The more favorable homogeneous stabilized ironcontaining siloxane product solutions were obtained by Examples 9–13 and 17, while less favorable stabilizied ironcontaining siloxane products were obtained by Examples 14–16 as witnessed by a red precipitate and low iron content in the pale yellow siloxane product supernate. The reaction mixture of Examples 13 and 15 also contained five weight percent of dimethylhydroxysiloxy end-blocked polydimethylsiloxane having a viscosity of 350 centistokes at 25°C. and 0.27 wt. % hydroxy groups as an additive in order to increase the hydroxy content of the reaction mixture.

lized iron-containing siloxane products of Examples 9–11 and 13–17 and on the otheer materials for comparison according to the Beaker Stability and Plugged Tube Stability tests given in Example 8. In the case of Examples 13 and 14 the iron-containing siloxane product samples were preheated for 16 hours at 250°C. to permit loss of the relative volatile components of the

TABLE 2

| Ex. No. | Viscosity[a] | | Amount of Siloxane | Reactor Vol. ml. | Reaction Temp. °C. | Reaction Time Hours | | | Air Flow Rate | | Found[b] ppm Fe | Found ppm OH[c] | |
|---|---|---|---|---|---|---|---|---|---|---|---|---|---|
| | Initial | Final | | | | Addn. Fe(CO)$_5$ Siloxane Premix | N$_2$ | Air | cc/min. | cc/min. per 100 ml. Siloxane | | Initial | Final |
| 9 | 3580 | 4140 | 1500 gr. | 2000 | 150 | 1 | 2 | 6 | 50 | 3.3 | 191 | 280 | 300 |
| 10 | 350 | 343 | 1500 gr. | 2000 | 150 | 1 | 3.5 | 5.5 | 25 | 1.7 | 226 | 210 | 180 |
| 11 | 296 | 303 | 1 gal. | 5000 | 150 | 1.25 | 0.8 | 4.5 | 75 | 2.7 | 197 | 240 | — |
| 12 | 43 | 43 | 1700 gr. | 5000 | 150–200 | [d] | 0 | 6 | [e] | [e] | 77 | 80 | — |
| 13 | 43 | 52 | 3750 gr. | 5000 | 150 | 1 | 1 | 5.5 | 100 | 2.7 | 222 | 211 | 200 |
| 14 | 43 | 43 | 1500 gr. | 2000 | 150 | 1 | 1 | 5.5 | 50 | 3.3 | ppt. | 80 | — |
| 15 | 84 | — | 1225 gr. | 2000 | 150 | 0.75 | 1 | 4.0 | 30 | 2.5 | small ppt. | 210 | — |
| 16 | 84 | 84 | 1500 gr. | 2000 | 150 | 1 | 2 | 6.5 | 50 | 3.3 | ppt on standing | 80 | 80 |
| 17 | 350 | 336 | 1500 gr. | 2000 | 160–170 | [f] | 0 | 6.0 | 25–50 | 1.7–3.3 | 205 | — | — |

[a] = viscosity of the trimethylsiloxy end-blocked dimethylpolysiloxane fluid in centistokes at 25°C. before additives. Nominal initial viscosities are given for Examples 10 and 17.
[b] = Parts by weight of iron found in the siloxane product per million parts by weight of said product.
[c] = Parts by weight of hydroxy found in the siloxane fluid including additives per million parts by weight of said fluid.
[d] = Iron carbonyl present in the reaction mixture during heat-up; it was not added under nitrogen.
[e] = No air flow used; vent via 2 × 24/40 joints.
[f] = Iron carbonyl-siloxane mixture heated under air; no flow; the carbonyl was not added under nitrogen; after 15 minutes at reaction temperature air was slowly bubbled through the reaction mixture for 1.75 hours; the air flow as then ended and the reaction continued under air for 4 more hours.

EXAMPLE 18

Thermal stability tests were carried out on the stabilized siloxane product prior to the Beaker Stability test. The results of said tests are given in Table 3.

TABLE 3

| Example No. | Beaker Stability | | Plugged Tube Stability | | |
|---|---|---|---|---|---|
| | Hours to Gel | Sample Wt. Loss, % | Hours to Gel | Precipitate Formed | Sample Wt. Loss, % |
| A | 2.5 | 8 | <16 | — | — |
| Ex. 9 | 240 | 31 | 96 | No | — |
| Ex. 10 | 744 | 55 | 96–120 | No | 27–40 |
| Ex. 11 | 768 | 59 | 96 | No | — |
| Ex. 13 | 1108 | 69 | 96 | No | — |
| Ex. 14 | >2.5 <8 | 42 | <24 | Yes at 250°C. | — |
| Ex. 15 | >840 | 66 | 50 | No | — |
| Ex. 16 | >2.5 <7 | 22 | <24 | Yes at 250°C. | — |
| Ex. 17 | 1000 | 47 | 96 | No | — |
| B | 24 | 15 | 24 | — | 10 |
| C | 54 | 50 | 336 | — | — |
| D | 120 | 56 | 552 | — | 56 |
| E | <120 | 60 | 336 | — | — |
| F | 185 | 31 | 40 | turbid | — |
| G | 132 | 33 | 98 | largely insoluble | 27 |
| H | 52 | 25 | 70 | largely insoluble | 21 |

A = a trimethyl siloxy end-blocked dimethylpolysiloxane having a viscosity of 350 centistokes at 25°C.
B = a polysiloxane fluid having a viscosity of 1000 centistokes at 25°C. and containing about 5% (molar) phenyl groups and about 95% (molar) methyl groups.
C = a polysiloxane fluid having a viscosity of 110 centistokes at 25°C. and containing about 25% (molar) phenyl groups and about 95% (molar) methyl groups.
D = a polysiloxane fluid having a viscosity of 580 centistokes at 25°C. and containing about 50% (molar) phenyl groups and about 50% (molar) methyl groups.
E = a polysiloxane fluid having a viscosity of 175 centistokes at 25°C. and containing diphenyl siloxy and dimethylsiloxy units in about a 50/50 ratio.
F = a commercial iron stabilized dimethylpolysiloxane oil having a viscosity of 4000 centistokes at 25°C., believed to be stabilized with an iron salt compound.
G = a mixture of a trimethylsiloxy end-blocked dimethylpolysiloxane fluid having a viscosity of about 350 centistokes at 25°C. and about 500 ppm of iron as ferric octaoate.
H = a mixture of a trimethylsiloxy end-blocked dimethylpolysiloxane fluid having a viscosity of about 350 centistokes at 25°C. and about 200 ppm of iron as ferric octoate.

EXAMPLE 19

The homogeneous stabilized iron-containing siloxane product solutions of Examples 9 and 10 in the presence of certain anti-oxidant additives were tested for limited air stability according to the Plugged Tube Stability test of Example 8. As a comparison said stability test was also carried out on mixtures of the same untreated siloxane polymer starting materials of Examples 9 and 10 and said additives. The results of said tests are given in TABLE 4.

TABLE 4

| Example No. | Additive Compound | Wt. % | Plugged Tube Stability Hours to Gel | Sample Wt Loss, % |
|---|---|---|---|---|
| A | C | 0.3–1.5 | 120 | — |
| B | C | 1.5 | 48 | — |
| A | D | 0.1–0.5 | 168–216 | — |
| B | D | 0.1–0.5 | 96–144 | — |
| Ex. 10 | D | 0.1–0.5 | 168–240 | 50 |
| Ex. 9 | D | 0.1–0.5 | 96–120 | — |
| Ex. 9 | C | 0.1–1.5 | 64–22$^a$ | — |

A = an untreated trimethylsiloxy end-blocked dimethylpolysiloxane fluid having a nominal viscosity of 350 centistokes at 25°C.
B = an untreated trimethylsiloxy end-blocked dimethylpolysiloxane fluid having a viscosity of 3580 centistokes at 25°C.
C = $C_6H_5NHC_6H_4O[(CH_3)_2SiO]_{8-10}C_6H_4NHC_6H_5$
D = N,N'-diphenyl-p-phenylenediamine
$^a$ = decreasing lifetime with increasing additive concentration.

Although the siloxane additive was anti-synergistic in the iron-containing siloxane product fluids, the non-phenolic phenylenediamine additive was compatible with the iron-containing siloxane product fluids.

EXAMPLE 20

Stabilization of silicone rubber by incorporation of $Fe(CO)_5$ into the formulation was demonstrated by 60 days heat aging at 495°F. of a sample prepared via the recipe in TABLE 5 given below. And comparing the properties of the resulting elastomer with those of a non-iron stabilized control. The control (Sample A) was brittle after 60 days heat aging whereas the iron-stabilized silicone rubber retained the useful properties shown in TABLE 5. Sample B was prepared using an untreated mixture of 0.5 wt. % $Fe(CO)_5$ in an ethoxy end-blocked polydimethylsiloxane fluid for convenience of the carbonyl. The ethoxy end-blocked polydimethylsiloxane fluid employed in both Sample A and Sample B had the average formula $C_2H_5O[Si(CH_3)_2O]_9C_2H_5$.

TABLE 5

| Recipe | Sample(Parts by Wt.) A | B |
|---|---|---|
| Siloxane Gum$^a$ | 100 | 100 |
| Filler | 46 | 46 |
| Siloxane Fluid $^b$ | 16 | — |
| Iron-containing Siloxane Fluid $^c$ | — | 16 |
| Days Bin Age | 3 | 3 |
| Hot Mill, minutes/°F. | 5/300 | 5/300 |
| Days Bin Age | 1 | 1 |
| 2,4-dichlorobenzoylperoxide catalyst | 1.1 | 1.1 |
| Post Cured Properties 16 Hours/495°F. | | |
| Durometer, Shore A | 55 | 55 |
| Tensile, psi | 1000 | 1010 |
| Elongation, % | 440 | 570 |
| Set at Break, % | 4 | 4 |
| Tear, Die B | 123 | 119 |
| Heat Age Properties 60 Days/410°F. | | |
| Durometer, Shore A | 68 | 63 |
| Tensile, psi | 710 | 610 |
| Elongation, % | 230 | 320 |
| Set at Break, % | Nil | 4 |
| Tear, Die B | 90 | 97 |
| Heat Age Properties 60 Days/495°F. | | |
| Durometer, Shore A | | 77 |
| Tensile, psi | (Em- | 600 |
| Elongation, % | brittled) | 120 |
| Set at Break, % | | Nil |
| Tear, Die B | | 77 |

$^a$ = A dimethylsiloxy, methylvinyl siloxane gum having a wt. avg. of about 500,000 grams/mole and about 2 wt.% of methylvinylsiloxy
$^b$ = The ethoxy end-blocked dimethylsiloxane fluid.
$^c$ = The unheated ethoxy end-blocked dimethylsiloxane fluid - $Fe(CO)_5$ mixture.

EXAMPLE 21

A concentrated stabilized iron-containing dimethylpolysiloxane fluid was prepared and used as an additive to an otherwise untreated dimethylpolysiloxane oil to effect high temperature stabilization of the latter. The concentrate was prepared in a 300 ml. flask containing a condenser, magnetic stirrer, gas inlet line, addition funnel, and thermometer by first heating to 150°C. under nitrogen a mixture of 64.6 grams of a dimethylhydroxysiloxy end-blocked dimethylpolysiloxane (350 centistoke viscosity at 25°C; 0.27 wt. % OH) in 109 ml. of octamethylcyclotetrasiloxane. To the stirred mixture was added over one hour a solution of 0.98 grams of $Fe(CO)_5$ (75% pure) in 20 ml. of octamethylcyclotetrasiloxane. After 2 hours, air was passed over the surface of the amber colored solution at a flow rate of 6 ml/min. The color of the mixture became lighter, turned reddish, and then deepened over the next 45 minutes. The reaction treatment was continued for 2.7 hours, whereupon the air flow was stopped and a nitrogen purge begun. After 30 minutes the deep red, homogeneous mixture was allowed to cool. The cyclic siloxane solvent was removed under vacuum, boiling point 31°C. at 1 mm., leaving 63.1 grams of the dark red stabilized iron-containing siloxane product. Analysis of the siloxane product showed it to contain 0.25 wt. % OH and 0.186 wt.% iron (theoretical, 0.32 wt.% iron).

The stabilized iron-containing siloxane product was tested as a stabilizer for dimethylpolysiloxane by mixing 0.975 grams of said siloxane product with 9.025 grams of untreated trimethylsiloxy end-blocked dimethylpolysiloxane oil (350 centistoke viscosity at 25°C) to give an orange, homogeneous iron-containing siloxane mixture containing 167 parts by weight of iron per million parts by weight of said siloxane mixture, which was tested for thermal stability according to the Beaker Stability test in Example 8 and found to have a lifespan of at least 528 hours before gelling (test arbitrarily stopped after 528 hours; 44% sample wt. loss).

Similarly another concentrate was prepared using 39.2 grams of dimethylhydroxysiloxy terminated dimethylpolysiloxane (having a viscosity of about 58 centistokes at 25°C.; 0.030 mol OH) in 95 ml. of octamethylcyclotetrasiloxane with addition of 3.0 grams (0.015 mol) of $Fe(CO)_5$ (75% pure) in 25 ml. of octamethylcyclotetrasiloxane. The homogeneous, red iron-containing siloxane product was distilled to remove the cyclic siloxane solvent under vacuum, boiling point 37°–38°C. at 1.9 mm., to leave 41.5 grams of dark red iron-containing siloxane oil. Loss of OH was observed by OH-analysis (0.41 wt. % OH found in the siloxane product vs. 1.33 wt. % OH in the initial siloxane fluid) and infra-red analysis. The iron-containing siloxane product concentrate was found to contain 7,200 parts by weight of iron per million parts by weight of said siloxane product, and had lost about 50 wt. % of the iron originally introduced. The iron-containing siloxane product concentrate was insoluble at the 3 wt. % level (216 parts by weight of iron in diluted sample per million parts by weight of sample) in a trimethylsiloxy end-blocked dimethylpolysiloxane (350 centistoke viscosity at 25°C.), but soluble in a trimethylsiloxy end-blocked dimethylpolysiloxane (50 centistoke viscosity at 25°C.). The latter stabilized iron-containing siloxane sample was tested for stability according to the Beaker Stability and Plugged Tube Stability tests given in Example 8 after the prepared test samples were first heated for 17 hours at 250°C. The samples were found to have a 48 hour life before gelling by the Plugged Tube Stability test at 325°C. and at least a 580 hour life before gelling by the Beaker Stability test at 325°C. (test arbitrarily stopped after 580 hours). However a diluted, but untreated iron-containing siloxane sample yielded a precipitate after several days standing at 23°C.

EXAMPLE 22

Instability to moisture of the novel iron-containing siloxane oils of the instant invention was demonstrated by placing samples of the stabilized iron-containing siloxane products of Examples 9 and 10 in petri dishes in a closed vessel under 100% relative humidity for 45–60 days at 24°C. whereupon the siloxane oils had become turbid. Said turbid samples were then tested for thermal stability by the Beaker Stability test of Example 8 and found to have a life of only 23 hours before gelling.

EXAMPLE 23

The behavior of trimethylsiloxy end-blocked dimethylpolysiloxane oils to which had been added 0.01–0.1 wt. % $Fe(CO)_5$ was examined at various temperatures according to the thermal stability tests of Example 8 without the usual pre-reaction of the iron pentacarbonyl with the siloxane. A sample of a 50 centistoke viscosity (25°C.) dimethylpolysiloxane oil containing 0.05 wt. % $Fe(CO)_5$ remained homogeneous in the Beaker Stability test at 200° and 250°C., but yielded a red precipitate within one hour in an open or Plugged Tube Stability test at both 200° and 250°C.

A sample of 350 centistoke viscosity (25°C.) dimethylpolysiloxane oil containing 0.1 wt. % $Fe(CO)_5$ gave a precipitate in less than 1.5 hours in the Plugged Tube Stability test at 325°C. However the same type of sample mixture in the 325°C. Beaker Stability test was not gelled after 360 hours, and in a second 325°C. Beaker Stability test gellation occurred only after 910 hours. At 300°C. the Beaker Stability test led to gellation after 40 hours with 0.01 wt. % $Fe(CO)_5$, (about 20 parts by weight of iron introduced), but to a life span of at least 208 hours before gellation (test arbitrarily terminated after 208 hours and a 12% wt. sample loss) with 0.05 wt. % $Fe(CO)_5$. After 52 hours in the Beaker Stability test at either 250°C. or 325°C., samples to which had been introduced 0.1 wt. % $Fe(CO)_5$ were found to contain about 200 parts by weight of iron per million parts by weight of the test product; thus the loss of iron was not significant under these conditions.

EXAMPLE 24

The stabilized iron-containing siloxane product of Example 6 was subjected to the Beaker Stability test of Examples 8 at 250°C. in the presence of various metals as shown in TABLE 6. After 80 days no apparent changes had occurred to the test samples containing the additional metals relative to the test sample of the stabilized product of Example 6 that was not mixed with additional metal. However in the presence of 5 wt. % molybdenum powder, the sample wt. loss was 87% in 5 days. After 2 days the sample wt. loss was 52% for the stabilized iron-containing siloxane product of Example 9 in the presence of 5 wt. % molybdenum powder.

TABLE 6

| Metal Added | Wt. % Metal | 250°C. Sample Wt.Loss,% |
|---|---|---|
| Copper powder | 5 | 13 |
| Aluminum foil | 5 | 10 |
| Iron powder | 5 | 13 |
| Tin mossy | 10 | 10 |
| Chromium powder | 5 | 11 |
| Zinc grannular | 10 | 11 |
| Nickel powder | 5 | 10 |
| None[a] | — | 10 |

[a] = Lifetime of unstabilized trimethylsiloxy end-blocked dimethylpolysiloxane (350 centistoke viscosity at 25°C.) was only 25 hours before gellation.

EXAMPLE 25

A mixture of 0.1 wt. % $Fe(CO)_5$ with 10 grams of beta-phenylethyl substituted dimethylsiloxane oil having the formula

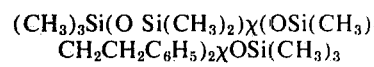

$$(CH_3)_3Si(O\ Si(CH_3)_2)_X(OSi(CH_3)$$
$$CH_2CH_2C_6H_5)_2\chi OSi(CH_3)_3$$

and a viscosity of about 400 centistokes at 25°C. was subjected to the Beaker Stability test of Example 8 at 200°C. A skin had formed over the test sample in 45 minutes, and the same behavior was observed for an untreated sample of the same siloxane oil by the same test procedure. At a 250°C. Beaker Stability test the iron-siloxane mixture sample also skinned in 45 minutes, whereas the control (iron-free siloxane) sample skinned in 15 minutes.

EXAMPLE 26

A 5-necked 300 ml. flask was fitted with a mechanical stirrer, condenser, thermometer, pressure-equalizing funnel, and gas inlet with a by-pass valve to a T- adaptor atop the condenser. To the vessel was added 175 grams of trimethylsiloxy end-blocked dimethylpolysiloxane oil (100 centistoke viscosity at 25% and apparently containing 200 ppm OH), and the apparatus was then purged with nitrogen. To the addition funnel was added 25 grams of said siloxane oil containing 0.20 grams of 75% pure $Fe(CO)_5$. The nitrogen flow was slowed to 5 ml/min. and set on by-pass mode, and heating was begun with stirring set at the point of incipient vortex of the siloxane oil. At 150°C. the iron-siloxane concentrate was added over 35 minutes and the resulting yellow mixture stirred for five hours under nitrogen. The pale orange mixture was then allowed to cool overnight. A 20 ml. sample was withdrawn (found: 235 ppm iron) and the balance of the mixture heated to 150°C., whereupon air was passed over the surface of the mixture at a rate of 6 ml./min. After 6.5 hours a deep cherry red iron-containing siloxane product solution was obtained and cooled. Said product solution was and remained apparently homogeneous upon storage.

Said iron-containing siloxane product solution was tested for thermal stability by the Beaker Stability test in Example 8 and had a beaker life of at least 650 hours at 325°C. (test arbitrarily stopped after 650 hours). Said product solution was also tested for stability by the Plugged Tube Stability test of Example 8 after the prepared test sample had been heated for 16 hours at 250°C. to devolatilize same and found to have a life of 48 hours before gelling at 325°C. Said Plugged Tube Stability test was repeated without the 250°C. devolatilization procedure and the sample product was found to have a gellation free-life of less than 22 hours at 325°C.

EXAMPLE 27

Example 25 was repeated except that 190 grams of the trimethylsiloxy end-blocked dimethylpolysiloxane oil was first mixed with 10 grams of dimethylhydroxysiloxy terminated dimethylpolysiloxane oil (350 centistoke viscosity at 25°C.) to increase the hydroxy content of the siloxane by about 50 wt.% to 325 ppm OH. A sample taken after the Fe(CO)$_5$ addition but prior to aeration contained 222 ppm of iron, whereas the final product contained only 162 ppm of iron. After 30 hours at 250°C. both iron-containing siloxane samples had a 72 hour life before gelling according to the Plugged Tube Stability test at 325°C. of Example 8.

EXAMPLE 28

Example 25 was repeated except that the trimethylsiloxy end-blocked dimethylpolysiloxane oil was heated to 200°C. before the Fe(CO)$_5$-siloxane mixture was added under nitrogen over 35 minutes. After one hour the temperature of the dense brown siloxane oil was allowed to drop slowly to 140°C. over two hours whereupon a 30 ml. sample was removed and found to have a life of 77 hours before gelling according to the Plugged Tube Stability test of Example 8. The final iron-containing siloxane product solution obtained had a viscosity of 101 centistokes at 22°C. and was tested for thermal stability according to the Plugged Tube Stability test of Example 8, after the prepared test sample had been devolatilized for 24 hours at 250°C., and found to have an 82 hour lifespan before gelling at 325°C. The reactor walls above the final iron-containing siloxane product after reaction contained a coating of an orange film, not present after reactions at 150°C. However the iron content both before and after aeration were about the same (210 ppm iron).

EXAMPLE 29

After two months storage at room temperature a sample of the iron-containing siloxane product solution of Example 11 was observed to give a precipitate within 8 hours at 325°C. according to the Plugged Tube Stability test of Example 8 and to gel within 24 hours (16% wt. loss) when the prepared Plugged Tube Stability test samples was first stored at 20 hours at 250°C. To test for deterioration on storage the Plugged Tube Stability test of Example 8 was repeated on room temperature aged samples as noted in TABLE 7. Only the aged product sample of Example 11 showed a change on comparison with the fresh test sample data given in Example 18, TABLE 3. (Unlike the sample test product of Example 13 in TABLE 3, the aged sample test product of Example 13 in TABLE 7 did not undergo the 250°C. devolatilization pretreatment.) The aged sample product of Example 11 was reaerated at 195°–215°C. for 5 hours at an air rate of 30 ml./min. to give a red iron-containing siloxane fluid which is listed as Example 29 in TABLE 7.

TABLE 7

| Example No. | Days Aged | Plugged Tube Stability | | |
|---|---|---|---|---|
| | | Precipitate Formed | Hours to Gel | Sample wt. Loss, % |
| Ex. 9 | 90 | No | 96 | 24 |
| Ex. 10 | 105 | No | 96 | 27 |
| Ex. 11 | 66 | Yes | 84 | 27 |
| Ex. 13 | 59 | Yes | 70 | 33 |
| Ex. 17 | 110 | No | 96 | 29 |
| Ex. 29 | 3 | No | 120 | 33 |

EXAMPLE 30

EXAMPLE 25 was repeated except that 200 grams of a phenyl containing dimethylpolysiloxane oil (25 mole % phenyl and 75 mole % methyl, having a viscosity of about 110 centistokes at 25°C.) was employed. Aeration at an air flow rate of 6 ml/min. was begun following 2 hours heating under nitrogen at 150°C. No sample was taken before aeration was begun. After 3.5 hours the aeration air flow rate was increased to 20 ml./min. for 1 hour. A red iron-containing siloxane product solution was obtained containing 114 ppm of iron. Samples of the iron-containing siloxane product solution were tested for thermal stability according to the Beaker Stability and Plugged Tube Stability tests of Example 8 at 325°C. without any volatilization pretreatment. The product test samples were found to have lifetimes of 504 hours (Plugged Tube Stability test; 59% sample wt. loss) and 204 hours (Beaker Stability test; 67% sample wt. loss) before gelling. Comparsion with the results given for the untreated phenyl containing siloxane of Example C in TABLE 3 shows that the stabilized iron-containing siloxane fluid of the present invention has greatly superior open air stability.

Various modifications and variations of this invention will be obvious to a worker skilled in the art and it is to be understood that such modifications and variations are to be included within the purview of this application and the spirit and scope of the appended claims.

What is claimed is:

1. A process for preparing a stabilized iron-containing diorganopolysiloxane compound which comprises heating a mixture consisting essentially of (1) a diorganopolysiloxane fluid consisting essentially of siloxy units selected from the group consisting of dimethylsiloxy, diphenylsiloxy, methylphenylsiloxy, methylhydroxysiloxy, methylvinylsiloxy, trimethylsiloxy and dimethylhydroxysiloxy units and (2) an iron carbonyl compound in an amount sufficient to provide from 20 parts by weight of iron to 10,000 parts by weight of iron in the stabilized iron-containing diorganopolysiloxane product based on a million parts of weight of said diorganopolysiloxane fluid and wherein said carbonyl is selected from the group consisting of $Fe(CO)_5$, $Fe_2(CO)_9$, $Fe_3(CO)_{12}$ and mixtures thereof, at a temperature of 120°C. to 350° C. in the presence of oxygen.

2. A process as defined in claim 1, wherein R is selected from the group consisting of alkyl, phenyl and vinyl radicals, wherein the iron carbonyl compound is $Fe(CO)_5$ in an amount sufficient to provide from 50 parts by weight of iron to 400 parts by weight of iron in the stabilized iron-containing diorganopolysiloxane product based on a million parts by weight of said 3. A process as defined in claim 2 wherein the diorganopolysiloxane fluid has a viscosity of about 50 to about 4000 centistokes at about 25°C.

4. A process as defined in claim 3 wherein the air is passed over the surface of the diorganopolysiloxane fluid.

5. A process as defined in claim 3, wherein the diorganopolysiloxane fluid is selected from the group consisting of trimethylsiloxy end-block dimethylpolysiloxane, dimethylhydroxysiloxy end-block dimethylpolysiloxane, and mixtures thereof and wherein the amount of iron pentacarbonyl is sufficient to provide from 100 parts by weight of iron to 250 parts by weight of iron based on a million parts by weight of said diorganopolysiloxane fluid.

6. A process as defined in claim 1 wherein the diorganopolysiloxane fluid is a heat curable diorganopolysiloxane gum, wherein the mixture contains filler as an additional ingredient and wherein the stabilized iron-containing diorganopolysiloxane product is a silicone elastomer.

7. A process as defined in claim 5, wherein the diorganopolysiloxane fluid contains at least 0.8 parts by weight of hydroxy groups attached to a silicon atom per one part by weight of iron in the stabilized iron-containing diorganopolysiloxane product.

8. A process as defined in claim 5, wherein the reaction temperature ranges from about 150°C. to about 200°C.

9. A process as defined in claim 5, wherein the reaction temperature ranges from about 275°C. to 325°C.

10. A process as defined in claim 8, wherein the diorganopolysiloxane fluid consists essentially of trimethylsiloxy end-blocked dimethylpolysiloxane.

11. A process as defined in claim 10, wherein air is passed over the surface of the trimethylsiloxy end-blocked dimethylpolysiloxane fluid.

12. A process as defined in claim 11 wherein the reaction temperature is about 150°C.

13. A process as defined in claim 12, wherein the trimethylsiloxy end-blocked dimethylpolysiloxane fluid contains about 1 part by weight of hydroxy groups attached to a silicon atom per one part by weight of iron in the stabilized iron-containing diorganopolysiloxane product.

14. A process as defined in claim 1 wherein the process is carried out under substantially anhydrous conditions.

15. A stabilized iron-containing diorganopolysiloxane product according to the process of claim 1.

16. A stabilized iron-containing diorganopolysiloxane product produced according to the process of claim 2.

17. A stabilized iron-containing diorganopolysiloxane product produced according to the process of claim 3.

18. A stabilized iron-containing diorganopolysiloxane product produced according to the process of claim 4.

19. A stabilized iron-containing diorganopolysiloxane product produced according to the process of claim 5.

20. A stabilized iron-containing diorganopolysiloxane product produced according to the process of claim 6.

21. A stabilized iron-containing diorganopolysiloxane product produced according to the process of claim 7.

22. A stabilized iron-containing diorganopolysiloxane product produced according to the process of claim 8.

23. A stabilized iron-containing diorganopolysiloxane product produced according to the process of claim 9.

24. A stabilized iron-containing diorganopolysiloxane product produced according to the process of claim 10.

25. A stabilized iron-containing diorganopolysiloxane product produced according to the process of claim 11.

26. A stabilized iron-containing diorganopolysiloxane product produced according to the process of claim 12.

27. A stabilized iron-containing diorganopolysiloxane product produced according to the process of claim 13.

28. A stabilized iron-containing diorganopolysiloxane product produced according to the process of claim 14.

* * * * *

UNITED STATES PATENT OFFICE
CERTIFICATE OF CORRECTION

Patent No. 3,865,784               Dated February 11, 1975

Inventor(s) R. S. Neale and A. N. Pines

It is certified that error appears in the above-identified patent and that said Letters Patent are hereby corrected as shown below:

After the term "said" in the last line of claim 2 in column 17 insert --- diorganopolysilane fluid and wherein the oxygen is air.---

Signed and sealed this 24th day of June 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,865,784    Dated February 11, 1975

Inventor(s) R. S. Neale and A. N. Pines

It is certified that error appears in the above-identified patent and that said Letters Patent are hereby corrected as shown below:

Column 10, line 2, "otheer" should be ---other---.

TABLE 2, the first line in the heading of the fifth column of said TABLE shown as "eac-" should be ---Reac- ---.

TABLE 3, line 2 of Footnote G the amount "500" should be ---400--- and "octaoate" should be ---octoate---.

TABLE 6, line 29 of column 14 "grannular" should be ---granular---.

Claim 15, line 2 (column 18, line 10) after "product" insert ---produced---.

Signed and Sealed this nineteenth Day of August 1975

[SEAL]

Attest:

RUTH C. MASON
Attesting Officer

C. MARSHALL DANN
Commissioner of Patents and Trademarks